Inventors:
Werner Krämer
Friedrich Hämmerling
Bernhard Kalkner

United States Patent Office 3,356,901
Patented Dec. 5, 1967

3,356,901
SHORT-CIRCUIT CURRENT LIMITER FOR COUPLED POWER SYSTEMS
Werner Krämer, Darmstadt, Friedrich Hämmerling, Konigstein, Taunus, and Bernhard Kalkner, Bad Homburg vor der Hohe, Germany, assignors to Licentia Patent-Verwaltungs-G.m.b.H., Frankfurt am Main, Germany
Filed Jan. 4, 1965, Ser. No. 423,239
Claims priority, application Germany, Feb. 3, 1964, L 46,947
6 Claims. (Cl. 317—20)

The present invention relates to a device for limiting overload currents.

Modern electric power distribution systems incorporate a number of basically independent systems which, however, are connected to each other so as to form an exceedingly complex over-all power distribution circuit. As the number of current mains which form part of the over-all system increases, so does the overflow current which may flow in the event of faults, and it has been found that the overflow currents which can result exceed those which have heretofore been experienced in individual distribution systems of less complexity. Thus, such overload circuit breakers and switches which are fully satisfactory in smaller distribution systems are, if incorporated in a complex system, often overloaded to such an extent that they sometimes can not interrupt the circuit at all, or only after a larger number of half waves. Furthermore, the components of the distribution system are, as a result of the unexpectedly high short-circuit currents, subjected to very large dynamic forces. This, in turn, can damage transformers, burn out conductors and disrupt switching stations.

The fact that it is not only the thermal effects of the short-circuit current which may cause damage but also the dynamic effect may produce damage and still further faults, makes it necessary to approach the electric circuit protection problem from a basically different point of view. That is to say, even if new high power circuit breakers are provided which could handle the short-circuit currents, the smaller distribution system is only partly protected, and even then, experience has shown that high performance circuit breakers can not completely ward off the effects of the dynamic forces produced by the short-circuit currents. The only way of effectively protecting the systems against such dynamic forces is to limit the current immediately, that is to say, if already the first half wave of the overload current is interrupted. Only then will the smaller distribution net be protected from the dynamic effects, and the switches incorporated in such smaller circuits will no longer be exposed to excessive loads and can, therefore, take care of interrupting their respective circuits during the normal time interval. In this way, the short circuit can be interrupted during the normal interval. Furthermore, the various power houses connected to the distribution system will then no longer be able to send short-circuit currents into the short circuit of the faulted distribution network, and, once the local short circuit has been interrupted, are once more ready for normal operation. It will be appreciated that if the current is limited during the time while the fault prevails, the normal operation can resume in a very much shorter time, and the distribution networks will not nearly as easily be disturbed, as would be the case but for the special steps taken.

It is, therefore, the primary object of the present invention to avoid these damages and to obtain the advantages described above, and, with this object in view, the present invention resides in a circuit arrangement for limiting overload currents in high power high tension alternating current distribution nets particularly at the point where individual distribution nets are coupled to each other. In accordance with the present invention, the circuit comprises a series connection of two reactances which have different algebraic signs, i.e., inductive and capacitative reactances, and which, in normal operation, have approximately the same impedance, the capacitative reactance having such a non-linear dependency on the current as to effect, above a permissible limit current, a marked change in the resulting total reactance and therefore a limiting of the current.

This can, for example, be accomplished by connecting the capacitor via a transformer which, by saturation of its iron core, limits the voltage and hence the current of the capacitor. However, the change-over from capacitative to inductive operation in the case of overload current, as can occur with this parallel connection of the capacitor and inductance of the transformer, is, under certain circumstances, undesired, giving due consideration to the possibility of single-phase faults in the case of a polyphase system. According to the present invention such jumps are avoided. The capacitor, which is connected to the line by means of a transformer having no saturation characteristics, is connected in parallel to a shunt path which is constituted by the series-circuit of a saturable choke and an ohmic resistance.

Additional objects and advantages of the present invention will become apparent upon consideration of the following description when taken in conjunction with the accompanying drawings in which.

Figure 1:
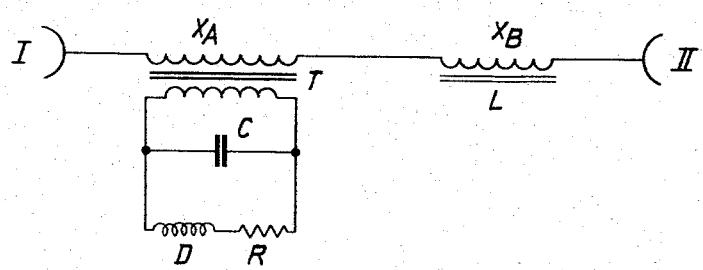
FIGURE 1 is a circuit diagram of one embodiment of the present invention.

Referring now to the drawings and first to FIGURE 1 thereof, the same shows one embodiment of a circuit according to the present invention. Here, two electric current nets I and II are shown which are connected to each other by a line which incorporates a resonant series-circuit, constituted of a capacitative reactance $X_A$ and an inductive reactance $X_B$. Capacitative reactance $X_B$ comprises a transformer T to whose secondary winding there is connected the capacitor C and, in parallel therewith, the series-circuit constituted by a choke coil D and a resistance R. The reactance $X_B$ is constituted by a choke L.

The choke D is so dimensioned that, at rated current, it represents a very high reactance and will let but a relatively small current flow through this parallel path which will, therefore, have virtually no effect on the capacitative value of the parallel circuit. When the limit current is reached, the inductance of the now saturated choke D collapses, so that the ohmic resistance R is, for all practical purposes, connected in parallel with the capacitor C and as a result changes the admittance very materially, i.e., the magnitude and the phase, but not the algebraic sign. Thus, the over-all admittance of the circuit is, without the abrupt transition effects, reduced immediately as soon as there is an overload current, which is the result sought.

The voltage drop across the parallel circuit, which is brought about by connecting in circuit the resistance R in case of overload as a result of the choke D is limited, and, despite the geometric addition, there is obtained sufficient, current-dependent change, of the over-all admittance. Preferably, the resistor R is so designed that after it has been connected into the circuit as a result of the collapse of the choke D in case of overload, the current flowing through this resistance R will be of at least the same order of magnitude as that which flows to the capacitor C.

The use of the transformer T is to be recommended also because in this way the choke D, which is made of high quality iron, need not be provided with bulky high-voltage insulation and the resistor R can be constituted, for example, as a grounded water resistor.

The following guide lines may be followed in constructing the circuit according to the present invention. In the region of the rated current, the reactive components $X_A$ and $X_B$ should be as nearly as possible equal to each other so that they can, for all practical purposes, operate with as small an ohmic total resistance as possible. In the overload current region, after the resistance R has become effective, the reactances $X_A$ and $X_B$ should again be approximately equal so that the operation is essentially ohmic. Consequently, the circuitry for the reactive effect becomes small, and, if need be, the current in the line between the nets I and II can easily be switched off.

Figure 2:
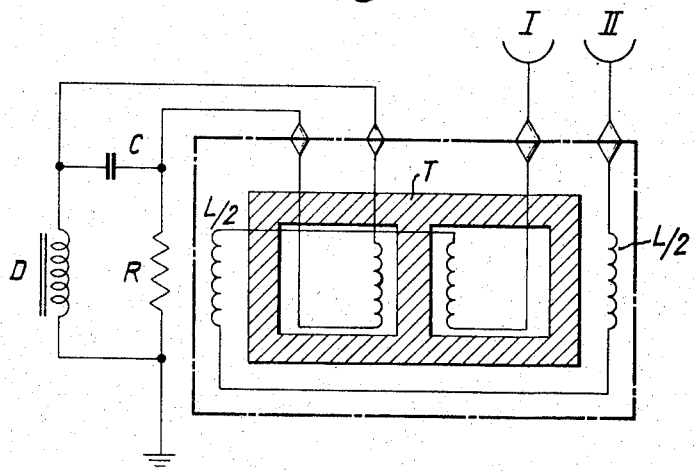
FIGURE 2 is a circuit diagram of another embodiment of the present invention.

In practice, the choke L and the transformer T are accommodated within the single bank. If the choke L and the transformer T were each arranged in a separate tank, it would be necessary to provide lead-ins capable of handling very high voltages, inasmuch as, under resonant conditions, the voltages appearing across the choke L and also across the terminals of the transformer, would be substantially higher than the operating voltage of the line. But if the choke L and the transformer T are arranged in a single tank, two high voltage lead-ins will suffice which need to be designed only to withstand the line voltage. This is shown in FIGURE 2, in which the terminals of L and T which are connected to each other, across which particularly high voltages appear under resonant conditions, need not be lead out of the transformer tank at all. This means that the expensive lead-ins which were heretofore required are completely eliminated.

Furthermore, the two iron cores of the choke of the transformer can, in part, be combined with each other, as shown in FIGURE 2. The center leg is, for example, constituted as a transformer at whose secondary there is connected the capacitor C as well as the saturable choke D with the series-resistance R which can be constituted, for example, as a grounded water resistance or as a voltage-dependent water resistance.

It will thus be seen that, in accordance with the present invention, there is provided an arrangement for limiting overload currents in a line between two alternating current nets which normally operate at a given frequency, this arrangement comprising a series-circuit tuned to have a resonant frequency approximately equal to the given frequency and composed of inductive reactance means and capacitative reactance means which, during normal operation, have approximately the same value thereby to offer substantially no impedance to a current through the line.

The capacitative reactance means have a non-linear current dependency which, above a predetermined current value, substantially changes the reactance of the capacitative reactance means thereby to detune the series-circuit so as substantially to increase the resulting total impedance, thereby effectively to limit the current through the line.

In accordance with the present invention, the capacitative reactance means comprises a capacitor and a shunt path connected in parallel with the capacitor, which shunt path, in turn, comprises an ohmic resistance and a closed core saturable choke which goes saturated above the predetermined current value through the line, so as to give the capacitative reactance means the desired non-linear current dependency.

It will be understood that the above description of the present invention is susceptible to various modifications, changes, and adaptations, and the same are intended to be comprehended within the meaning and range of equivalents of the appended claims.

What is claimed is:

1. An arrangement for limiting overload currents in a line between two alternating current nets which normally operate at a given frequency, said arrangement comprising a series-circuit tuned to have a resonant frequency approximately equal to said given frequency and composed of inductive reactance means and capacitative reactance means which, during normal operation, have approximately the same value thereby to offer substantially no impedance to a current through said line, said capacitative reactance means comprising a capacitor and a shunt path connected in parallel with said capacitor, said shunt path comprising an ohmic resistance and a closed core saturable choke, said saturable choke going saturated above a predetermined current value through said line, said capacitative reactance means thus having a current dependency which, above said predetermined current value, substantially changes the reactance of said capacitative reactance means thereby to detune said series-circuit so as substantially to increase the resulting total impedance, thereby effectively to limit the current through said line.

2. An arrangement as defined in claim 1 wherein said capacitative reactance means further comprise a transformer having a primary connected in said line, said transformer having a secondary to which is connected the parallel connection of said capacitor and said shunt path.

3. An arrangement as defined in claim 2 wherein said inductive reactance means comprise a choke coil, said arrangement further comprising a tank within which are arranged said transformer and said choke coil.

4. An arrangement as defined in claim 2 wherein said inductive reactance means comprise a choke coil, said arrangement including a core common to said transformer and to said choke coil.

5. An arrangement as defined in claim 1 wherein said ohmic resistor comprises a water resistance.

6. An arrangement as defined in claim 1 wherein said ohmic resistor is voltage-dependent.

References Cited

UNITED STATES PATENTS

| | | | |
|---|---|---|---|
| 1,755,111 | 4/1930 | Gay | 317—20 X |
| 3,152,282 | 10/1964 | Baltensperger et al. | 317—11 |

MILTON O. HIRSHFIELD, *Primary Examiner.*

R. V. LUPO, *Assistant Examiner.*